(12) United States Patent
Kamiyoshi et al.

(10) Patent No.: US 8,163,671 B2
(45) Date of Patent: *Apr. 24, 2012

(54) DYE RECEIVING LAYER COMPOSITIONS FOR THERMAL TRANSFER IMAGE-RECEIVING SHEETS

(75) Inventors: Nobumichi Kamiyoshi, Wakayama (JP); Takashi Mukai, Wakayama (JP); Shinichi Sata, Wakayama (JP)

(73) Assignee: KAO Corporation, Tokyo (JP)

( * ) Notice: Subject to any disclaimer, the term of this patent is extended or adjusted under 35 U.S.C. 154(b) by 888 days.

This patent is subject to a terminal disclaimer.

(21) Appl. No.: 12/190,714

(22) Filed: Aug. 13, 2008

(65) Prior Publication Data

US 2009/0056862 A1    Mar. 5, 2009

(30) Foreign Application Priority Data

Aug. 29, 2007    (JP) .................................. 2007-222517

(51) Int. Cl.
*B41M 5/035* (2006.01)
*B41M 5/50* (2006.01)

(52) U.S. Cl. ............................ 503/227; 528/76; 528/176

(58) Field of Classification Search ........................ None
See application file for complete search history.

(56) References Cited

U.S. PATENT DOCUMENTS 5,069,944 A * 12/1991 Yamagishi et al. ........... 427/444
5,457,081 A * 10/1995 Takiguchi et al. ............ 503/227

OTHER PUBLICATIONS

U.S. Appl. No. 12/274,720, filed Nov. 20, 2008, Kamiyoshi, et al.

* cited by examiner

*Primary Examiner* — Bruce H Hess
(74) *Attorney, Agent, or Firm* — Oblon, Spivak, McClelland, Maier & Neustadt, L.L.P.

(57) ABSTRACT

The present invention relates to a dye receiving layer composition for thermal transfer image-receiving sheets which includes a resin containing a polyester produced by using an alcohol component containing 50 mol % or more of an alkyleneoxide adduct of 2,2-bis(4-hydroxyphenyl)propane and an oxazoline group-containing compound. There are provided a composition for a dye receiving layer of a thermal transfer image-receiving sheet which is excellent in not only dyeability upon thermal transfer but also releasability from a transfer sheet, and a thermal transfer image-receiving sheet having a dye receiving layer obtained from the above composition which is capable of obtaining transferred images having excellent properties.

11 Claims, No Drawings

DYE RECEIVING LAYER COMPOSITIONS FOR THERMAL TRANSFER IMAGE-RECEIVING SHEETS

FIELD OF THE INVENTION

The present invention relates to a composition used for a dye receiving layer of a thermal transfer image-receiving sheet and a process for producing the composition, and also relates to a thermal transfer image-receiving sheet having a dye receiving layer containing the composition.

BACKGROUND OF THE INVENTION

There has been proposed the method for forming color images on a thermal transfer image-receiving sheet which is dyeable with a sublimable dye by using a thermal transfer sheet composed of the sublimable dye as a recording agent and a substrate on which the sublimable dye is supported. In this method, the dye is heated using a thermal head of a printer as a heating means and transferred on the image-receiving sheet to obtain the color images. The thus formed images are very clear and excellent in transparency because of the dye used, and are therefore expected to provide high-quality images which are excellent in reproducibility of half tones and gradation.

In the dye receiving layer of some of the thermal transfer image-receiving sheets, polyesters are used from the viewpoint of an excellent dyeability thereof. As the thermal transfer image-receiving sheets using such polyesters, there are disclosed, for example, thermal transfer image-receiving sheets in which a dye receiving layer formed on a substrate sheet is produced from a dispersion prepared by dispersing a dye-acceptable resin such as polyesters obtained using ethylene glycol, etc., as raw components, in an aqueous medium (JP 6-135170A), thermal transfer dye-receiving sheets in which a dye receiving layer contains a polyester produced from a diol component containing an alkylene glycol adduct of bisphenol A and a dicarboxylic acid component containing terephthalic acid, and a crosslinked product thereof obtained by using an isocyanate compound as a crosslinking agent (JP 2933338), thermal transfer image-receiving sheets in which a dye receiving layer contains a polyester resin produced from a dicarboxylic acid component containing 40 mol % or more of an alicyclic dicarboxylic acid compound and a diol component containing 15 mol % or more of a diol compound having a bisphenol A backbone as a dye acceptable resin, and further contains a hydrogenated xylylene diisocyanate-modified product as a crosslinking agent (JP 2002-19306A), polyester films for sublimation-type heat-sensible recoding materials having a coating layer in which an aqueous oxazoline group-containing polymer is contained at a weight ratio of from 0.10 to 0.50 (JP 8-11447A), etc. In addition, it is also disclosed that a composition containing a polyester produced by using polyoxypropylene (2.2)-2,2-bis(4-hydroxyphenyl)propane as an alcohol component is used as a surface-treating agent for papers which is applied onto a printing medium for electrophotographic toners (Example 1 of JP 5-295100A).

SUMMARY OF THE INVENTION

Thus, the present invention relates to the following aspects (1) to (5).

(1) A dye receiving layer composition for thermal transfer image-receiving sheets, including a resin containing a polyester produced by using an alcohol component containing 50 mol % or more of an alkyleneoxide adduct of 2,2-bis(4-hydroxyphenyl)propane represented by the formula (I):

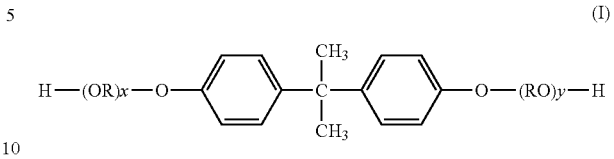

(I)

wherein RO is an oxyalkylene group; R is at least one group selected from an ethylene group and a propylene group; and x and y each represents a molar number of addition of alkylene oxides, and are respectively a positive number, with the proviso that a sum of x and y is from 2 to 7 on the average, and an oxazoline group-containing compound.

(2) The dye receiving layer composition according to the above aspect (1), wherein at least a part of the oxazoline group-containing compound contains a crosslinked polyester obtained by crosslinking at least a part of the polyester therewith.

(3) A process for producing a dye receiving layer composition for thermal transfer image-receiving sheets, which includes the step of mixing a resin containing particles of a polyester produced by using an alcohol component containing 50 mol % or more of an alkyleneoxide adduct of 2,2-bis(4-hydroxyphenyl)propane represented by the above formula (I) with an oxazoline group-containing compound.

(4) A thermal transfer image-receiving sheet which including the dye receiving layer containing the dye receiving layer composition as defined in the above aspect (1).

(5) A thermal transfer method including the step of conducting thermal transfer by using a thermal transfer image-receiving sheet having a dye receiving layer containing a composition which includes a resin containing 70% by weight or more of a polyester produced by using an alcohol component containing 50 mol % or more of an alkyleneoxide adduct of 2,2-bis(4-hydroxyphenyl)propane represented by the above formula (I), and an oxazoline group-containing compound.

DETAILED DESCRIPTION OF THE INVENTION

The techniques described in JP 6-135170A, JP 2933338, JP 2002-19306A and JP 8-11447A all are unsatisfactory in dyeability of the image-receiving sheet upon thermal transfer, or in releasability of an image-receiving sheet from a thermal transfer sheet owing to heat fusion therebetween. As a result, there tends to arise such a problem that the transferred images obtained by these techniques are insufficient in image property. In particular, although the amount of dyes adhered onto the image-receiving sheet increases with increase in image density, if the releasability between the image-receiving sheet and the thermal transfer sheet is deteriorated, there tends to arise such a problem that irregular reflection is caused on the resultant image portions owing to non-uniform surface condition thereof, so that the obtained images fail to show a high image density. Also, if the technique described in JP 5-295100A which aims at printing with an electrophotographic toner, is applied to thermal transfer printing, there tends to arise the same problem as described above. The reason therefor is as follows. That is, the printing step using the electrophotographic toner is conducted by such a method in which the toner as a recording agent is electrically and mechanically transferred onto a recording medium, and then the thus transferred toner is fixed on the medium by heating with a heat roller, etc., whereas the thermal transfer printing is such a method in which the transfer and fixing of the sublimable dye as a recording agent are simultaneously carried out under heating. Therefore, both the printing methods are different in mechanism for releasability as well as properties as required, from each other.

The present invention provides a composition for a dye receiving layer of a thermal transfer image-receiving sheet which is excellent in not only dyeability upon thermal transfer but also releasability of the image-receiving sheet from a transfer sheet, as well as a thermal transfer image-receiving sheet having a dye receiving layer obtained from the above composition which is capable of obtaining transferred images having excellent properties.

[Dye Receiving Layer Composition for Thermal Transfer Image-Receiving Sheets]

The dye receiving layer composition for thermal transfer image-receiving sheets according to the present invention contains a resin containing a polyester produced by using an alcohol component containing 50 mol % or more of an alkyleneoxide adduct of 2,2-bis(4-hydroxyphenyl)propane represented by the above formula (I), and an oxazoline group-containing compound.

Polyester

The polyester used in the present invention is obtained by subjecting the alcohol component containing 50 mol % or more of an alkyleneoxide adduct of 2,2-bis(4-hydroxyphenyl)propane represented by the above formula (I) and a known carboxylic acid component such as carboxylic acids, carboxylic anhydrides and carboxylic acid esters as raw monomers to esterification reaction.

In the above formula (I), RO is an oxyalkylene group; R is an ethylene group and/or a propylene group; and x and y each represent a molar number of addition of alkylene oxides, and are respectively a positive number. Although the respective R groups may be the same or different, a sum of x and y is from 2 to 7 and preferably from 2 to 5 on the average from the viewpoint of a good reactivity with the carboxylic acid component.

Specific examples of the alkyleneoxide adduct of 2,2-bis(4-hydroxyphenyl)propane represented by the above formula (I) include polyoxypropylene-2,2-bis(4-hydroxyphenyl)propane and polyoxyethylene-2,2-bis(4-hydroxyphenyl)propane which have the molar number of addition of alkyleneoxides within the above-specified range.

The content of the alkyleneoxide adduct of 2,2-bis(4-hydroxyphenyl)propane represented by the above formula (I) in the raw alcohol component is 50 mol % or more, preferably 70 mol % or more, more preferably 80 mol % or more and most preferably 100 mol % from the viewpoints of a good releasability of the thermal transfer image-receiving sheet containing the dye receiving layer composition (hereinafter occasionally referred to merely as the "thermal transfer image-receiving sheet of the present invention") and a good dyeability thereof.

In the present invention, the raw alcohol component used therein may also contain, in addition to the alkyleneoxide adduct of 2,2-bis(4-hydroxyphenyl)propane represented by the above formula (I), other known alcohol components. Examples of the other alcohol components include ethylene glycol, propylene glycol, glycerol, pentaerythritol, trimethylol propane, hydrogenated bisphenol A, sorbitol, and alkylene ($C_2$ to $C_4$) oxide adducts (average molar number of addition: 1 to 16) of these compounds. These other alcohol components may be used alone or in combination of any two or more thereof.

Examples of the raw carboxylic acid component include dicarboxylic acids such as phthalic acid, isophthalic acid, terephthalic acid, fumaric acid, maleic acid, adipic acid and succinic acid; succinic acids substituted with an alkyl group having 1 to 20 carbon atoms or an alkenyl group having 2 to 20 carbon atoms such as dodecenyl succinic acid and octenyl succinic acid; trivalent or higher-valent polycarboxylic acids such as trimellitic acid and pyromellitic acid; and anhydrides and alkyl ($C_1$ to $C_3$) esters of these acids. These carboxylic acid components may be used alone or in combination of any two or more thereof.

In the present invention, from the viewpoint of a good dyeability of the thermal transfer image-receiving sheet, among these carboxylic acid components, preferred are the succinic acids containing an alkyl group and/or an alkenyl group; more preferred are the succinic acids containing an alkyl group having 1 to 22 carbon atoms or an alkenyl group having 2 to 22 carbon atoms such as dodecenyl succinic acid and octenyl succinic acid; and even more preferred are the succinic acids containing a linear, branched or cyclic alkyl group having 8 to 22 carbon atoms and preferably 10 to 20 carbon atoms or a linear, branched or cyclic alkenyl group having 8 to 22 carbon atoms and preferably 10 to 20 carbon atoms.

Specific examples of the alkyl group contained in the succinic acid containing an alkyl group and/or an alkenyl group include various octyl groups, various decyl groups, various dodecyl groups, various tetradecyl groups, various hexadecyl groups, various octadecyl groups and various icosyl groups.

Specific examples of the alkenyl group contained in the succinic acid containing an alkyl group and/or an alkenyl group include various octenyl groups, various decenyl groups, various dodecenyl groups, various tetradecenyl groups, various hexadecenyl groups, various octadecenyl groups and various icosenyl groups.

The content of the succinic acid containing an alkyl group and/or an alkenyl group in the carboxylic acid component is preferably from 5 to 50 mol % in order to enhance the dyeability of the thermal transfer image-receiving sheet. The reason therefor is considered as follows. That is, the alkyl group or the alkenyl group present in a side chain of the succinic acid serves for reducing an interaction between molecules of the polyester, so that dyes can penetrate up to an inside of the polyester. From the viewpoint of a good penetrability of the dyes into the polyester, i.e., a good dyeability of the thermal transfer image-receiving sheet, the content of the succinic acid containing an alkyl group and/or an alkenyl group in the carboxylic acid component is more preferably from 10 to 40 mol % and even more preferably from 20 to 40 mol %.

The polyester may be produced, for example, by polycondensing the alcohol component and the carboxylic acid component in an inert gas atmosphere at a temperature of 180 to 250° C., if required, in the presence of an esterification catalyst. From the viewpoint of a good releasability of the thermal transfer image-receiving sheet of the present invention, the raw polyester preferably has a narrow molecular weight distribution, and is produced by polycondensation using an esterification catalyst. Examples of the esterification catalyst include tin catalysts, titanium catalysts, and metal compounds such as antimony trioxide, zinc acetate and germanium dioxide.

The polyester used in the present invention preferably has a softening point of from 80 to 165° C. and a glass transition point of from 50 to 85° C. from the viewpoints of a good storage stability of the dye receiving layer composition for thermal transfer image-receiving sheets as well as a good releasability and a good storage stability of the thermal transfer image-receiving sheet of the present invention. Also, the polyester preferably has an acid value of from 1 to 35 mg KOH/g, more preferably from 5 to 35 mg KOH/g and even more preferably from 10 to 35 mg KOH/g from the viewpoints of a good reactivity with the oxazoline group and a good light resistance of the thermal transfer image-receiving sheet of the present invention. Meanwhile, the desired glass transition point, softening point and acid value of the polyester can be attained by adequately controlling kinds and blending ratios of the monomers used as well as reaction temperature and time used in the polycondensation.

In addition, from the viewpoint of a good film-forming property of the dye receiving layer composition for thermal transfer image-receiving sheets, the number-average molecular weight of the polyester is preferably from 1,000 to 10,000 and more preferably from 2,000 to 8,000.

Meanwhile, in the present invention, as the polyester, there may also be used modified polyesters which are obtained by modifying the polyester to such an extent that the properties of the polyester are still kept within the above-specified ranges substantially without deterioration thereof. Examples of the modified polyesters include polyesters which are grafted or blocked with phenol, urethane, epoxy, etc., by the methods described in JP 11-133668A, JP 10-239903A, JP 8-20636A, etc., and composite resins having tow or more kinds of resin units including polyester units.

Polyester-Containing Resin

In the dye receiving layer composition of the present invention, the polyester-containing resin is preferably contained in the form of polyester-containing resin particles. More specifically, the polyester-containing resin may be of any configuration such as a powder and particles dispersed in a dispersing medium. From the viewpoint of a good environmental suitability, the polyester-containing resin may be contained in the form of the resin particles dispersed in an aqueous medium. The content of the polyester in the polyester-containing resin is preferably 70% by weight or more, more preferably 80% by weight or more and most preferably 100% by weight from the viewpoint of a good dyeability of the resin.

The resin particles may also contain resins other than polyesters.

Examples of the resins other than polyesters which may be contained in the resin particles include known resins usable in the dye receiving layer of the thermal transfer image-receiving sheet, e.g., polyolefin-based resins such as polypropylene, halogenated polymers such as polyvinyl chloride and polyvinylidene chloride, vinyl polymers such as polyvinyl acetate, polyacrylic esters and polyvinyl acetal, polystyrene-based resins, polyamide-based resins, copolymer-based resins of olefins such as ethylene and propylene with other vinyl monomers, ionomers, cellulose-based resins such as cellulose diacetate, and polycarbonates. Among these resins, preferred are polyvinyl chloride and polycarbonates from the viewpoints of a good releasability and a good dyeability of the thermal transfer image-receiving sheet of the present invention.

The aqueous medium used for dispersing the polyester-containing resin therein contains water as a main component, i.e., in an amount of 50% or more. From the viewpoint of an environmental suitability, the water content in the aqueous medium is preferably 80% by weight or more, more preferably 90% by weight or more and most preferably 100% by weight. Examples of components other than water which may be contained in the aqueous medium include water-soluble organic solvents such as methanol, ethanol, isopropanol, butanol, acetone, methyl ethyl ketone and tetrahydrofuran.

The volume-median particle size ($D_{50}$) of the polyester-containing resin particles is preferably from 20 nm to 1 μm, more preferably from 50 to 800 nm and even more preferably from 80 to 500 nm from the viewpoint of a good film-forming property upon producing the thermal transfer image-receiving sheet. Meanwhile, the "volume-median particle size ($D_{50}$)" used herein means a particle size at which a cumulative volume frequency calculated on the basis of a volume fraction of particles from a smaller particle size side thereof is 50%, and may be measured by the below-mentioned method.

From the viewpoint of a good dyeability of the thermal transfer image-receiving sheet, the content of the polyester-containing resin in a solid component of the dye receiving layer composition for thermal transfer image-receiving sheets according to the present invention is preferably from 70 to 100% by weight, more preferably from 75 to 100% by weight and even more preferably from 80 to 100% by weight. Meanwhile, the content of the polyester-containing resin in the solid component of the dye receiving layer composition may be calculated from the amounts of the respective components charged upon production of the dye receiving layer composition for thermal transfer image-receiving sheet.

Oxazoline Group-Containing Compound

As the oxazoline group-containing compound used in the present invention (hereinafter occasionally referred to merely as an "oxazoline compound"), there may be used those compounds containing a plurality of oxazoline groups in a molecule thereof Examples of the compounds containing a plurality of oxazoline groups in a molecule thereof include difunctional-type compounds such as 2,2-(1,3-phenylene)-bis 2-oxazoline and 2,2-(1,4-phenylene)-bis 2-oxazoline; and polyfunctional-type compounds (polymers) obtained by polymerizing a polymerizable monomer containing an oxazoline group.

Among these oxazoline compounds, from the viewpoint of effectively exhibiting a crosslinking effect upon the crosslinking reaction with the polyester-containing resin, preferred are the oxazoline group-containing polymers. When using the oxazoline group-containing polymers, it is considered that the crosslinking reaction with the polyester-containing resin is promoted, so that the molecular weight of the resin forming the dye receiving layer composition is increased, thereby improving a releasability between the image-receiving sheet and the thermal transfer sheet. The oxazoline group-containing polymers may be produced, for example, by polymerizing an oxazoline group-containing polymerizable monomer, and further optionally by copolymerizing the oxazoline group-containing polymerizable monomer with a polymerizable monomer containing no oxazoline group which is copolymerizable therewith.

Examples of the oxazoline group-containing polymerizable monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline and 2-isopropenyl-5-ethyl-2-oxazoline. These oxazoline group-containing polymerizable monomers may be used alone or in combination of any two or more thereof Among these monomers, preferred is 2-isopropenyl-2-oxazoline from the viewpoint of easiness of availability.

Examples of the polymerizable monomer containing no oxazoline group include (meth)acrylic acid esters such as methyl (meth)acrylate, ethyl (meth)acrylate, n-butyl (meth)acrylate, isobutyl (meth)acrylate, t-butyl (meth)acrylate, cyclohexyl (meth)acrylate, 2-ethylhexyl (meth)acrylate, methoxy polyethylene glycol (meth)acrylate, lauryl (meth)acrylate, stearyl (meth)acrylate, 2-hydroxyethyl (meth)acrylate, 2-hydroxypropyl (meth)acrylate, monoesters of (meth)acrylic acid and polyethylene glycol, 2-aminoethyl (meth)acrylate and salts thereof, caprolactone-modified products of (meth)acrylic acid, 2,2,6,6-tetramethyl piperidine (meth)acrylate and 1,2,2,6,6-pentamethyl piperidine (meth)acrylate; (meth)acrylic acid salts such as sodium (meth)acrylate, potassium (meth)acrylate and ammonium (meth)acrylate; unsaturated nitriles such as acrylonitrile and methacrylonitrile; unsaturated amides such as (meth)acrylamide, N-methylol (meth)acrylamide and N-(2-hydroxyethyl) (meth)acrylamide; vinyl esters such as vinyl acetate and vinyl propionate; vinyl ethers such as methyl vinyl ether and ethyl vinyl ether; α-olefins such as ethylene and propylene; halogen-containing α,β-unsaturated aliphatic hydrocarbons such as vinyl chloride, vinylidene chloride and vinyl fluoride; and α,β-unsaturated aromatic hydrocarbons such as styrene, vinyl benzene, α-methyl styrene and styrene sodium sulfonate. These monomers may be used alone or in combination of any two or more thereof.

The oxazoline group-containing polymers preferably have a weight-average molecular weight of from 500 to 2,000,000 and more preferably from 1,000 to 1,000,000 from the viewpoints of a good crosslinking reactivity with the resin particles and a good productivity.

In the dye receiving layer composition of the present invention, the oxazoline compound may be used in the form of powder, but is preferably used in the form of a solution or dispersion prepared by dissolving or dispersing the oxazoline compound in an aqueous medium from the viewpoints of a good crosslinking reactivity with the polyester-containing resin and a good productivity. When using the oxazoline compound in the form of a dispersion in an aqueous medium, the volume-median particle size ($D_{50}$) of the dispersed particles of the oxazoline compound is preferably from 0.02 to 1 µm and more preferably from 0.05 to 0.8 µm from the viewpoint of a good crosslinking reactivity with the polyester-containing resin. As the aqueous medium in which the oxazoline compound is dispersed or dissolved, there may be used the same aqueous media as described previously.

Meanwhile, examples of ordinary commercial products of the oxazoline group-containing polymers include "EPOCROSS WS SEIES" (water-soluble type) and "EPOCROSS K SEIES" (emulsion type) both available from Nippon Catalyst Co., Ltd.

The content of the oxazoline compound in the dye receiving layer composition or the amount of the oxazoline compound added thereto is preferably from 0.1 to 30 parts by weight and more preferably from 1 to 20 parts by weight in terms of a solid content on the basis of 100 parts by weight of the polyester-containing resin from the viewpoints of a good crosslinking reactivity with the polyester-containing resin and a good productivity.

Dye Receiving Layer Composition

The dye receiving layer composition for thermal transfer image-receiving sheets according to the present invention is composed of the resin containing the polyester produced by using the alcohol component containing 50 mol % or more of the alkyleneoxide adduct of 2,2-bis(4-hydroxyphenyl)propane represented by the above formula (I), and the oxazoline compound. These components are preferably contained in the composition in such amounts as specified above. Also, from the viewpoint of the aimed effects of the present invention, the dye receiving layer composition preferably contains a crosslinked polyester obtained by crosslinking at least a part of the oxazoline group-containing compound with at least a part of the above polyester. The resin containing the crosslinked polyester obtained by crosslinking the polyester using the oxazoline compound is more preferably produced by mixing the polyester-containing resin and the oxazoline compound with each other in an aqueous medium to conduct a crosslinking reaction therebetween.

That is, in the present invention, an adequate amount of the oxazoline compound is added to the resin dispersion, and mixed therewith at a desired temperature, whereby a part of the polyester-containing resin particles dispersed in the resin dispersion are crosslinked. In general, since the molecular weight of a polyester is increased when subjected to crosslinking reaction, the obtained crosslinked polyester tends to enhance releasability but deteriorate film-forming property. However, in the present invention, it is considered that the polyester-containing resin particles are mainly subjected to crosslinking reaction in the vicinity of a surface thereof. Therefore, since non-crosslinked polyester is still present within the resin particles, it is considered that the resultant thermal transfer image-receiving sheet can exhibit both a good releasability and a good film-forming property.

Therefore, the dye receiving layer composition for thermal transfer image-receiving sheets according to the present invention preferably contains the resin containing 70% by weight or more of the polyester obtained by using the alcohol component containing 50 mol % or more of the alkyleneoxide adduct of 2,2-bis(4-hydroxyphenyl)propane represented by the above formula (I) in which the polyester-containing resin contains a crosslinked polyester obtained by crosslinking at least a part of the polyester with at least a part of the oxazoline group-containing compound.

The presence of the crosslinking obtained owing to the oxazoline compound and polyester may be identified by analyzing whether any amide group produced by the crosslinking reaction is present in the resin. Meanwhile, in order to enhance the detection sensitivity, the presence of the crosslinked polyester may also be identified by drying an insoluble component extracted from the resin with tetrahydrofuran (THF) using a Soxhlet extractor and then analyzing the dried component by FT-IR ATR (attenuated total reflection) method.

In the present invention, the polyester is prevented from exhibiting an extremely high molecular weight because of a low reactivity of the alkyleneoxide adduct of 2,2-bis(4-hydroxyphenyl)propane used as the raw alcohol component, so that a large number of end groups are present in the resultant polyester. For this reason, it is considered that the crosslinking effect owing to a crosslinking agent such as the oxazoline compound can be effectively exhibited. Meanwhile, the presence of the non-crosslinked polyester may be confirmed, for example, by existence of an acid value.

The dye receiving layer composition of the present invention preferably contains a releasing agent from the viewpoint of further enhancing a releasability of the thermal transfer image-receiving sheet upon the thermal transfer. As the releasing agent, there may be adequately used, for example, a colloid solution of fine particles of dispersible or water-soluble modified silicone oil and/or a silicic anhydride (e.g., colloidal silica), etc. The average particle size of the fine particles of the silicic anhydride dispersed in the colloid solution is preferably 100 nm or less from the viewpoint of a good dispersibility thereof in the thermal transfer image-receiving sheet. More preferably, there is used colloidal silica having an average particle size of 20 nm or less. The content of the releasing agent in the dye receiving layer composition is from 0.1 to 20 parts by weight and preferably from 0.5 to 10 parts by weight on the basis of 100 parts by weight of the polyester-containing resin.

The dye receiving layer composition of the present invention preferably contains a pigment or a filler such as titanium oxide, zinc oxide, kaolin clay, calcium carbonate and silica fine particles from the viewpoint of enhancing a whiteness of the dye receiving layer and a clarity of transferred images. The content of the pigment or filler in the dye receiving layer composition is from 0.1 to 20 parts by weight on the basis of 100 parts by weight of the polyester-containing resin from the viewpoint of a good whiteness of the thermal transfer image-receiving sheet of the present invention. Meanwhile, the dye receiving layer composition of the present invention may further contain, if required, other additives such as, for example, catalysts.

[Process for Producing Dye Receiving Layer Composition]

The process for producing the dye receiving layer composition for thermal transfer image-receiving sheets according to the present invention includes the step of mixing the resin containing the polyester produced by using the alcohol component containing 50 mol % or more of the alkyleneoxide adduct of 2,2-bis(4-hydroxyphenyl)propane represented by the above formula (I), with the oxazoline group-containing compound. The details of the polyester, polyester-containing resin, oxazoline group-containing compound and dye receiving layer composition are the same as described previously.

More specifically, the dispersed particles of the polyester-containing resin is preferably produced by the method of dissolving the polyester-containing resin in a ketone-based solvent, adding a neutralizing agent to the resultant solution to ionize a carboxyl group contained in the polyester-containing resin, and then adding water the thus neutralized solution, followed by distilling off the ketone-based solvent therefrom to convert the resultant dispersion to an aqueous phase. Even more preferably, for example, using a reactor equipped with a stirrer, a reflux condenser, a thermometer, a dropping funnel and a nitrogen gas inlet tube, the solution prepared by dissolving the polyester-containing resin in the ketone-based solvent is mixed with a neutralizing agent, etc., to ionize a carboxyl group contained therein (not required when the carboxyl group is already ionized), and then water is added to the obtained reaction solution, followed by distilling off the ketone-based solvent therefrom to convert the dispersion to an aqueous phase. The dissolution in the ketone-based solvent and addition of the neutralizing agent are usually conducted at a temperature not higher than a boiling point of the ketone-based solvent. Also, examples of the water used in the above method include deionized water.

Examples of the ketone-based solvent usable in the process include acetone, methyl ethyl ketone, diethyl ketone, dipropyl ketone, methyl isobutyl ketone and methyl isopropyl ketone. Among these ketone-based solvents, methyl ethyl ketone is preferred from the viewpoints of a good solubility of the resin therein and facilitated removal of the solvent by distillation.

Examples of the neutralizing agent include an aqueous ammonia solution, an aqueous solution of alkali such as sodium hydroxide, and amines such as allyl amine, isopropyl amine, diisopropyl amine, ethyl amine, diethyl amine, triethyl amine, 2-ethylhexyl amine, 3-ethoxypropyl amine, diisobutyl amine, 3-diethylaminopropyl amine, tri-n-octyl amine, t-butyl amine, sec-butyl amine, propyl amine, methylaminopropyl amine, dimethylaminopropyl amine, n-propanol amine, butanol amine, 2-amino-4-pentanol, 2-amino-3-hexanol, 5-amino-4-octanol, 3-amino-3-methyl-2-butanol, monoethanol amine, N,N-dimethyl ethanol amine, isopropanol amine, neopentanol amine, diglycol amine, ethylene diamine, 1,3-diaminopropane, 1,2-diaminopropane, 1,6-diaminohexane, 1,9-diaminononane, 1,12-diaminodecane, dimerized aliphatic acid diamine, 2,2,4-trimethylhexamethylene diamine, 2,4,4-trimethylhexamethylene diamine, hexamethylene diamine, N-aminoethyl piperazine, N-aminopropyl piperazine, N-aminopropyl dipiperidinopropane and piperazine. The neutralizing agent may be used in such an amount capable of neutralizing at least an acid value of the polyester-containing resin.

Meanwhile, the thus obtained dye receiving layer composition of the present invention preferably contains no surfactant from the viewpoints of allowing the resultant polyester to show a self-dispersibility and enhancing a hydrophobic property of the thermal transfer image-receiving sheet obtained by using the dye receiving layer composition. Further, it is preferable to use no surfactant in the process for producing the above composition.

In the process for producing the dye receiving layer composition according to the present invention, the dispersion containing the polyester-containing resin and the oxazoline compound are mixed with each other at the above mixing ratio and subjected to crosslinking reaction, thereby enhancing a releasability between the transfer sheet and the image-receiving sheet upon thermal transfer of dyes from the transfer sheet. In particular, the polyester-containing resin and the oxazoline compound are preferably mixed with each other and subjected to crosslinking reaction in an aqueous medium. The temperature used in the crosslinking reaction is preferably from 60 to 100° C. and more preferably from 70 to 98° C. When the polyester-containing resin and the oxazoline compound are heated and mixed together in the above-specified temperature range, at least a part of the polyester can be crosslinked with the oxazoline compound to an adequate extent. That is, in the present invention, by adding an adequate amount of the oxazoline compound to the resin dispersion and mixing the oxazoline compound and the resin dispersion in the above-specified temperature range, at least a part of the resin particles dispersed in the resin dispersion are crosslinked and the molecular weight of the resin is increased. As a result, it is considered that the obtained composition is enhanced in releasability and further prevented from being deteriorated in film-forming property owing to presence of the non-crosslinked polyester inside of the resin particles, thereby maintaining formation of good images even when the molecular weight of the resin is increased.

The solid component of the polyester/crosslinking agent dispersion containing the polyester-containing resin and the oxazoline compound dispersed in the aqueous medium has a glass transition point of preferably from 40 to 80° C. and more preferably from 50 to 75° C., and a softening point of preferably from 80 to 250° C. and more preferably from 120 to 220° C. from the viewpoints of a good storage stability of the dye receiving layer composition as well as a good storage stability and a good dyeability of the thermal transfer image-receiving sheet of the present invention.

The concentration of the solid component in the polyester/crosslinking agent dispersion is preferably from 20 to 40% by weight, more preferably from 25 to 40% by weight and still more preferably from 30 to 40% by weight from the viewpoint of a good productivity. In addition, the pH of the above aqueous dispersion as measured at 25° C. is preferably from 5 to 10, more preferably from 6 to 9 and even more preferably from 7 to 9 from the viewpoint of a good storage stability of the polyester/crosslinking agent dispersion.

In the present invention, the crosslinking of the polyester-containing resin with the oxazoline compound may be conducted either upon production of the dye receiving layer composition or upon applying the composition onto the sheet.

[Thermal Transfer Image-Receiving Sheet]

The thermal transfer image-receiving sheet of the present invention may be obtained by applying the polyester/crosslinking agent dispersion containing the above polyester-containing resin and the oxazoline compound (or mixture of the dispersion with an aqueous dispersion of the other resin), or a dispersion prepared by optionally adding a coagulant such as butyl Carbitol and diethyl Carbitol, a curing agent or the above other additives to the above polyester/crosslinking agent dispersion, as a coating solution of the dye receiving layer composition, onto at least one surface of a substrate, for example, by a gravure printing method, a screen printing method, a reverse roll coating method using a gravure printing plate, etc., and drying the obtained coating layer to form a dye receiving layer.

The thickness of the thus formed dye receiving layer is generally from 1 to 50 μm, and preferably from 3 to 15 μm from the viewpoints of a good image quality and a good productivity. In addition, the solid content in the coating layer after dried is preferably from 3 to 15 g per 1 m² of the obtained dye receiving layer.

Examples of the substrate include synthetic papers (such as polyolefin-based papers and polystyrene-based papers), wood-free papers, art papers, coated papers, cast coated papers, wall papers, backing papers, synthetic resin- or emulsion-impregnated papers, synthetic rubber latex-impregnated papers, synthetic resin-internally added papers, paper boards, cellulose fiber papers, and films or sheets made of various resins such as polyolefins, polyvinyl chloride, polyethylene terephthalate, polystyrene, polymethacrylate and polycarbonates. Further, as the substrate, there may also be used white opaque films produced by shaping a mixture of these resins with a white pigment or a filler into a film, or foamed sheets, as well as laminates composed of combination of these substrates.

The thickness of these substrates is generally, for example, from about 10 to about 300 μm. The substrates are preferably subjected to surface treatments such as primer treatment and corona discharge treatment from the viewpoint of enhancing an adhesion thereof to the dye receiving layer.

[Thermal Transfer Method]

The present invention also relates to a thermal transfer method conducted by using the thermal transfer image-receiving sheet containing the above dye receiving layer composition.

The transfer sheet used upon conducting a thermal transfer procedure using the above thermal transfer image-receiving sheet of the present invention is usually in the form of a sheet obtained by forming a dye layer containing a sublimable dye on a paper or a polyester film, and there may be used any of conventionally known transfer sheets.

Examples of the sublimable dye suitably used for the thermal transfer image-receiving sheet of the present invention include yellow dyes such as pyridone-azo-based dyes, dicyano-styryl-based dyes, quinophthalone-based dyes and merocyanine-based dyes; magenta dyes such as benzene-azo-based dyes, pyrazolone-azomethine-based dyes, isothiazole-based dyes and pyrazolo-triazole-based dyes; cyan dyes such as anthraquinone-based dyes, cyano-methylene-based dyes, indophenol-based dyes and indonaphthol-based dyes.

As the method for applying a heat energy upon the thermal transfer, there may be used any of conventionally known methods, for example, the method of applying a heat energy of from about 5 to about 100 mJ/mm² by controlling a recording time using a recording apparatus such as a thermal printer.

In accordance with the present invention, there can be provided a dye receiving layer composition for thermal transfer image-receiving sheets which is excellent in not only dyeability upon thermal transfer but also releasability from the transfer sheet, as well as a thermal transfer image-receiving sheet having a dye receiving layer composed of the above composition which exhibits an excellent image performance.

The dye receiving layer composition of the present invention is excellent in not only dyeability but also releasability from the transfer sheet and, therefore, can be suitably used in a thermal transfer image-receiving sheet capable of exhibiting an excellent image performance.

The present invention is described in more detail by referring to the following examples, etc. However, it should be noted that these examples are only illustrative and not intended to limit the invention thereto.

In the following Examples, etc., various properties were measured and evaluated by the following methods.

[Acid Value of Resins]

The acid value of resins was measured according to JIS K0070. However, with respect to the solvent used upon the measurement, the mixed solvent of ethanol and ether was replaced with a mixed solvent containing acetone and toluene at a volume ratio of 1:1.

[Softening Point and Glass Transition Point of Polyesters]

(1) Softening Point

Using a flow tester "CFT500D" available from Shimadzu Seisakusho Co., Ltd., 1 g of a sample was extruded through a nozzle having a die pore diameter of 1 mm and a length of 1 mm while heating at a temperature rise rate of 6° C./min and applying a load of 1.96 MPa thereto by a plunger. The softening point was determined as the temperature at which a half the amount of the sample was flowed out when plotting a downward movement of the plunger of the flow tester relative to the temperature.

(2) Glass Transition Point

Using a differential scanning calorimeter ("Pyris 6DSC" available from Perkin Elmer, Inc.), a sample was heated to 200° C. and then cooled from 200° C. to 0° C. at a temperature drop rate of 10° C./min, and thereafter heated again at temperature rise rate of 10° C./min. The temperature at which an extension of a baseline below a maximum peak temperature observed in the endothermic curve was intersected with a tangential line having a maximum inclination of the curve in a region of from a rise-up portion of the peak to an apex of the peak was read as the glass transition point.

[Number-Average Molecular Weight of Resins]

The number-average molecular weight was calculated from the molecular weight distribution measured by gel permeation chromatography according to the following method.

(1) Preparation of Sample Solution

The resin was dissolved in tetrahydrofuran (THF) to prepare a solution having a concentration of 0.5 g/100 mL. The resultant solution was then filtered through a fluororesin filter ("FP-200" available from Sumitomo Electric Industries, Co., Ltd.) having a pore size of 2 μm to remove insoluble components therefrom, thereby preparing a sample solution.

(2) Measurement of Molecular Weight Distribution

Using the below-mentioned analyzer, THF was allowed to flow at a rate of 1 mL/min, and the column was stabilized in a thermostat at 40° C. One-hundred microliters of the sample solution was injected into the column to measure a molecular weight distribution thereof The molecular weight of the sample was calculated on the basis of a calibration curve previously prepared. The calibration curve of the molecular weight was prepared by using several kinds of monodisperse polystyrenes (those polystyrenes having molecular weights of 2.63×10³, 2.06×10⁴ and 1.02×10⁵ available from Tosoh Corp.; and those polystyrenes having molecular weights of 2.10×10³, 7.00×10³ and 5.04×10⁴ available from GL Science Co., Ltd.) as standard samples.

Analyzer: CO-8010 (available from Tosoh Corp.)

Column: GMHLX+G3000HXL (available from Tosoh Corp.)

[Particle Size of Resin Particles]

The particle size of resin particles was measured using a laser diffraction particle size analyzer ("LA-920" available from HORIBA Co., Ltd.). That is, a cell for the measurement was filled with distilled water, and a volume median particle size ($D_{50}$) of the resin particles was measured at a concentration at which an absorbance thereof was within an adequate range.

[Solid Concentrations of Polyester-Containing Resin Dispersion and Polyester/Crosslinking Agent Dispersion]

Using an infrared moisture meter ("FD-230" available from Ketto Science Laboratory Co., Ltd.), 5 g of the dispersion was dried at 150° C., and the water content (%) thereof on a wet base was measured under a measuring mode 96 (monitoring time: 2.5 min; variation width: 0.05%). The solid concentration of each dispersion was calculated according to the following formula.

Solid Concentration (%)=100−$M$ wherein M is a water content (%) on a wet base represented by the following formula:

Water Content (%) on Wet Base=[($W-W_0$)/$W$]×100 wherein W is a weight of the sample before measurement (initial weight of the sample); and $W_0$ is a weight of the sample after measurement (absolute dry weight of the sample).

[Softening Point and Glass Transition Point of Polyester/Crosslinking Agent Dispersion]

The polyester/crosslinking agent dispersion containing the polyester-containing resin and the oxazoline compound was freeze-dried at −10° C. for 9 h using a freeze-drying apparatus "FDU-2100" available from Tokyo Rika Kiki Co., Ltd., and then the softening point and glass transition point of the thus dried product were measured by the same method as used above for measuring the softening point and glass transition point of the polyester.

PRODUCTION EXAMPLE 1

Production of Polyester (a)

A four-necked flask equipped with a nitrogen inlet tube, a dehydration tube, a stirrer and a thermocouple was charged with 17,500 g of polyoxypropylene(2.2)-2,2-bis(4-hydroxyphenyl)propane, 16,250 g of polyoxyethylene(2.0)-2,2-bis(4-hydroxyphenyl)propane, 11,454 g of terephthalic acid, 1,608 g of dodecenyl succinic anhydride, 4,800 g of trimellitic anhydride and 15 g of dibutyl tin oxide. The contents of the flask were reacted with each other at 220° C. in a nitrogen atmosphere while stirring until the softening point as measured according to ASTM D36-86 reached 120° C., thereby obtaining a polyester (a). As a result, it was confirmed that the thus obtained polyester (a) had a softening point of 125° C., a glass transition point of 65° C., an acid value of 19 mg KOH/g and a number-average molecular weight of 3580.

PRODUCTION EXAMPLE 2

Production of Polyester (b)

A four-necked flask equipped with a nitrogen inlet tube, a dehydration tube, a stirrer and a thermocouple was charged with 3920 g of polyoxypropylene(2.2)-2,2-bis(4-hydroxyphenyl)propane, 1560 g of polyoxyethylene(2.0)-2,2-bis(4-hydroxyphenyl)propane, 1672 g of dodecenyl succinic anhydride, 1354 g of terephthalic acid and 25 g of tin octylate. The contents of the flask were reacted with each other at 230° C. for 5 h under normal pressures in a nitrogen atmosphere, and further reacted under reduced pressure. Thereafter, 304 g of trimellitic anhydride was added to the obtained reaction product, and the resultant mixture was further reacted until the softening point as measured according to ASTM D36-86 reached 120° C., thereby obtaining a polyester (b). As a result, it was confirmed that the thus obtained polyester (b) had a softening point of 115° C., a glass transition point of 57° C., an acid value of 15 mg KOH/g and a number-average molecular weight of 4200.

PRODUCTION EXAMPLE 3

Production of Polyester (c)

A four-necked flask equipped with a nitrogen inlet tube, a dehydration tube, a stirrer and a thermocouple was charged with 3653 g of 1,2-propanediol, 5976 g of terephthalic acid and 25 g of tin octylate. The contents of the flask were reacted with each other at 230° C. for 5 h under normal pressures in a nitrogen atmosphere, and further reacted under reduced pressure. Thereafter, 921 g of trimellitic anhydride was added to the obtained reaction product, and the resultant mixture was further reacted until the softening point as measured according to ASTM D36-86 reached 120° C., thereby obtaining a polyester (c). As a result, it was confirmed that the thus obtained polyester (c) had a softening point of 121° C., a glass transition point of 68° C., an acid value of 17 mg KOH/g and a number-average molecular weight of 3160.

The monomer composition and properties of the respective polyesters (a) to (c) obtained above are shown in Table 1.

TABLE 1

|  | Production Examples | | |
|---|---|---|---|
|  | 1 | 2 | 3 |
| Polyester | (a) | (b) | (c) |
| Raw monomers |  |  |  |
| Alcohol |  |  |  |
| BPA-PO*¹ | 17500 g (50) | 3920 g (70) |  |
| BPA-EO*² | 16250 g (50) | 1560 g (30) |  |
| 1,2-propanediol |  |  | 3653 g (100) |
| Carboxylic acid |  |  |  |
| Terephthalic acid | 11454 g (63) | 1354 g (51) | 5976 g (75) |
| Dodecenyl succinic anhydride | 1608 g (6) | 1672 g (39) |  |
| Trimellitic anhydride | 4800 g (23) | 304 g (10) | 921 g (10) |
| Softening point (° C.) | 125 | 115 | 121 |
| Glass transition temperature (° C.) | 65 | 57 | 68 |
| Acid value (mg KOH/g) | 19 | 15 | 17 |
| Number-average molecular weight | 3580 | 4200 | 3160 |

Note
*Numerals in parentheses indicate molar ratios on the basis of 100 mol as a total amount of the alcohol components;
*¹Polyoxypropylene (2.2)-2,2-bis(4-hydroxyphenyl)propane;
*²Polyoxyethylene (2.0)-2,2-bis(4-hydroxyphenyl)propane

PRODUCTION EXAMPLE 4

Production of Polyester Dispersion A

A four-necked flask equipped with a nitrogen inlet tube, a reflux condenser, a stirrer and a thermocouple was charged with 450 g of the polyester (a), and the polyester (a) was dissolved in 810 g of methyl ethyl ketone at 40° C. Next, 14.5 g of a 25% ammonia aqueous solution was added to the obtained solution and further 987 g of deionized water was added thereto under stirring, and then methyl ethyl ketone was distilled off from the obtained reaction solution at 50° C. under reduced pressure, thereby obtaining a polyester dispersion A. As a result, it was confirmed that the volume-median particle size of the polyester particles dispersed in the thus obtained polyester dispersion A was 410 nm, and the polyester dispersion A had a solid content of 34.6% and a pH of 7.6.

PRODUCTION EXAMPLE 5

Production of Polyester Dispersion B

A four-necked flask equipped with a nitrogen inlet tube, a reflux condenser, a stirrer and a thermocouple was charged with 300 g of the polyester (a), and the polyester (a) was dissolved in 540 g of methyl ethyl ketone at 40° C. Next, 7.9 g of N,N-dimethyl ethanol amine was added to the obtained solution and further 718 g of deionized water was added thereto under stirring, and then methyl ethyl ketone was distilled off from the obtained reaction solution at 50° C. under reduced pressure, thereby obtaining a polyester dispersion B. As a result, it was confirmed that the volume-median particle size of the polyester particles dispersed in the thus obtained polyester dispersion B was 100 nm, and the polyester dispersion B had a solid content of 31.9% and a pH of 8.4.

PRODUCTION EXAMPLES 6 to 8

Production of Polyester Dispersions C to E

The same procedure as in Production Example 4 was repeated except that the polyesters as shown in Table 2 were respectively used, and the methyl ethyl ketone, ammonia aqueous solution and deionized water were respectively used in amounts as shown in Table 2, thereby obtaining respective polyester dispersions C to E. The volume-median particle size of the polyester particles dispersed in the respective obtained polyester dispersions as well as the solid content and pH of the respective dispersions are shown in Table 2.

The composition and properties of the respective obtained polyester dispersions A to E are shown in Table 2.

TABLE 2

|  | Production Examples | | | | |
|---|---|---|---|---|---|
|  | 4 | 5 | 6 | 7 | 8 |
| Polyester dispersion | A | B | C | D | E |
| Polyester (a) | 450 g | 300 g | 300 g | | |
| Polyester (b) | | | | 300 g | |
| Polyester (c) | | | | | 300 g |
| Methyl ethyl ketone | 810 g | 540 g | 540 g | 540 g | 540 g |
| N,N-dimethyl ethanol amine | | 7.9 g | | | |
| 25% ammonia aqueous solution | 14.5 g | | 5.6 g | 5.35 g | 6.29 g |
| Deionized water | 987 g | 718 g | 712 g | 712 g | 700 g |
| Particle size (nm) | 410 | 100 | 93 | 105 | 100 |
| Solid content (wt %) | 34.6 | 31.9 | 35.3 | 37 | 32.4 |
| pH | 7.6 | 8.4 | 7.5 | 7.6 | 7.9 |

EXAMPLE 1

Production of Polyester/Crosslinking Agent Dispersion A

A four-necked flask equipped with a nitrogen inlet tube, a reflux condenser, a stirrer and a thermocouple was charged with 300 g of the polyester dispersion B and 9.2 g of a water-soluble oxazoline-containing polymer ("EPOCROSS WS-500" available from Nippon Catalyst Co., Ltd.; weight-average molecular weight: 70,000; number-average molecular weight: 20,000), and the contents of the flask were reacted with each other under stirring at 95° C. for 4 h, thereby obtaining a polyester/crosslinking agent dispersion A. As a result, it was confirmed that the volume-median particle size of the particles dispersed in the thus obtained polyester/crosslinking agent dispersion A was 100 nm, and the polyester/crosslinking agent dispersion A had a solid content of 32.1% and a pH of 8.0.

EXAMPLES 2 AND 3

Production of Polyester/Crosslinking Agent Dispersions B and C)

The same procedure as used for production of the polyester/crosslinking agent dispersion A in Example 1 was repeated except that the amount of the water-soluble oxazoline-containing polymer ("EPOCROSS WS-500" available from Nippon Catalyst Co., Ltd.) was changed as shown in Table 3, thereby obtaining polyester/crosslinking agent dispersions B and C respectively containing the polyester-containing resin and the oxazoline compound.

EXAMPLES 4, 5 AND COMPARATIVE EXAMPLE 1

Production of Polyester/Crosslinking Agent Dispersions D to F

The same procedure as used for production of the polyester/crosslinking agent dispersion A in Example 1 was repeated except that the polyester dispersions C, D and E were respectively used in place of the polyester dispersion B as shown in Table 3, and an oxazoline-containing polymer ("EPOCROSS WS-700" available from Nippon Catalyst Co., Ltd.; weight-average molecular weight: 40,000; number-average molecular weight: 20,000) was used in place of the water-soluble oxazoline-containing polymer ("EPOCROSS WS-500" available from Nippon Catalyst Co., Ltd.), and used in an amount as shown in Table 3, thereby obtaining polyester/crosslinking agent dispersions D to F respectively containing the polyester-containing resin and the oxazoline compound.

The composition and properties of the respective obtained polyester/crosslinking agent dispersions A to F obtained in Examples 1 to 5 and Comparative Example 1 are shown in Table 3.

TABLE 3

|  | Examples | | | | | Comp. Ex. |
|---|---|---|---|---|---|---|
|  | 1 | 2 | 3 | 4 | 5 | 1 |
| Polyester/crosslinking agent dispersion | A | B | C | D | E | F |
| Polyester dispersion B (g) | 300 | 300 | 300 | | | |
| Polyester dispersion C (g) | | | | 700 | | |
| Polyester dispersion D (g) | | | | | 700 | |
| Polyester dispersion E (g) | | | | | | 700 |
| EPOCROSS WS-500 (g) | 9.2 | 4.6 | 13.8 | | | |
| EPOCROSS WS-700 (g) | | | | 74 | 54 | 62 |
| Volume-median particle size (nm) | 100 | 100 | 100 | 91 | 107 | 4120 |
| Solid content (wt %) | 32.1 | 33.3 | 32.6 | 35.4 | 36.4 | ** |
| pH | 8.0 | 8.2 | 8.3 | 8.6 | 8.7 | |

Note
**: Aggregated and not coatable

EXAMPLES 6 TO 12 AND COMPARATIVE EXAMPLE 2

Production of Thermal Transfer Image-Receiving Sheet

A coating solution prepared by mixing the respective dispersions and additives as shown in Table 4 was applied onto a cast-coated paper (thickness: 210 μm) at 25° C. using a wire bar such that a coating amount thereof after drying was 5.0 g/m$^2$, and then dried at 60° C., thereby obtaining a thermal transfer image-receiving sheet. A monochrome gradation pattern (18 gradations) was printed onto the thus obtained thermal transfer image-receiving sheet using a sublimation-type printer ("SELPHY ES-1" available from Canon Corp.). The monochrome gradation pattern was composed of solid images each having a size of 0.6 cm square in which the L values thereof were changed from 0 to 255 at intervals of 15. The evaluation items including printing sensitivity, maximum density and heat fusion between the sheet and an ink ribbon upon printing, were measured and evaluated by the following methods. The results are shown in Table 4. Meanwhile, the numerals corresponding to the respective components as shown in Table 4 indicate amounts of the components blended.

Evaluation Methods

[Printing Sensitivity (Evaluation of Dyeability)]

The density of transferred color obtained in a low-density printed image (9th gradation; L=120) was measured using a Gretag densitometer (available from GRETAG-MACBETH Corp.). The higher density of the transferred color means a more excellent dyeability of the image-receiving sheet.

[Maximum Density (Evaluation of Dyeability with Dyes and Releasability from Transfer Sheet)]

The density of transferred color obtained in a high-density printed image (18th gradation; L=0) was measured using a Gretag densitometer (available from GRETAG-MACBETH Corp.). The higher density of the transferred color means a more excellent dyeability of the image-receiving sheet. Although the amount of dyes adhered onto the image-receiving sheet increased with increase in image density, when the releasability between the image-receiving sheet and the thermal transfer sheet was deteriorated, irregular reflection was caused on the obtained image portions owing to non-uniform surface condition thereof, so that the obtained images failed to show a high image density.

[Heat Fusion (Evaluation of Releasability From Transfer Sheet)]

The heat fusion between the image-receiving sheet and the transfer sheet was determined from a sound generated when the ink ribbon was peeled from the dye receiving sheet upon printing the gradation pattern, according to the following ratings.

A: No strange sound upon peeling, and no problems owing to heat fusion between the thermal transfer dye receiving sheet and the ink ribbon.

B: Slight strange sound upon peeling, but no problems owing to heat fusion

C: Heat fusion occurred with difficulty in peeling

TABLE 4

|  | Examples | | | | Examples | | | Comp. Ex. 1 |
|---|---|---|---|---|---|---|---|---|
|  | 6 | 7 | 8 | 9 | 10 | 11 | 12 | |
| Coating solution Dispersion (solid content: 30 wt %) | | | | | | | | |
| Polyester dispersion A (g) | 2.5 | 2.5 | | | | | | |
| Polyester dispersion B (g) | | | | | | | | |
| Polyester/crosslinking agent dispersion A (g) | | | 2.5 | | | | | |
| Polyester/crosslinking agent dispersion B (g) | | | | 2.5 | | | | |
| Polyester/crosslinking agent dispersion C (g) | | | | | 2.5 | | | |
| Polyester/crosslinking agent dispersion D (g) | | | | | | 2.5 | | |
| Polyester/crosslinking agent dispersion E (g) | | | | | | | 2.5 | |
| Crosslinking agent | | | | | | | | |
| EPOCROSS WS-500 (g) | 0.11 | | | | | | | |
| 1,3-BPO*$^1$ | | 0.03 | | | | | | |
| Coagulant | | | | | | | | |
| Butyl Carbitol acetate (g) | 0.08 | 0.08 | 0.08 | 0.08 | | | | |
| Releasing agent | | | | | | | | |
| KF615A*$^2$ (g) | 0.04 | 0.04 | 0.04 | 0.04 | | | | |
| Glass transition point of solid component*$^3$ (° C.) | 61 | 46 | 61 | 62 | | | | |
| Softening point of solid component*$^3$ (° C.) | 192 | 92 | 182 | 145 | | | | |
| Evaluation | | | | | | | | |
| Dyeability: Printing sensitivity | 0.47 | 0.66 | 0.45 | 0.47 | | | | |
| Dyeability/Releasability: Maximum density | 1.44 | 1.49 | 1.40 | 1.46 | | | | |
| Releasability: Heat fusion | A | B | A | A | | | | |

TABLE 4-continued

| Crosslinking agent | | | | |
|---|---|---|---|---|
| EPOCROSS WS-500 (g) | | | | |
| 1,3-BPO*1 | | | | |
| Coagulant | | | | |
| Butyl Carbitol acetate (g) | 0.08 | 0.08 | 0.08 | 0.08 |
| Releasing agent | | | | |
| KF615A*2 (g) | 0.04 | 0.04 | 0.04 | 0.04 |
| Glass transition point of solid component*3 (° C.) | 61 | 60 | 54 | 62 |
| Softening point of solid component*3 (° C.) | 187 | 243 | 219 | 118 |
| Evaluation | | | | |
| Dyeability: Printing sensitivity | 0.44 | 0.40 | 0.47 | 0.35 |
| Dyeability/Releasability: Maximum density | 1.45 | 1.42 | 1.54 | 1.48 |
| Releasability: Heat fusion | A | A | A | C |

Note
*1 1,3-BPO: (2,2-(1,3)phenylene-bis(2-oxazoline); reagent available from Tokyo Kasei Kogyo Co., Ltd.; molecular weight: 216.24; mp = 146° C.)
*2 KF615A: Polyether-modified silicone available from Shin-Etsu Chemical Industry Co., Ltd.
*3 Solid component in an aqueous dispersion containing the polyester-containing resin and the oxazoline compound; However, in Examples 7 and 8, the solid component indicates a solid component in the dispersion obtained by mixing the polyester dispersion A with the crosslinking agent, and in Comparative Example 1, it indicates a solid component in the polyester dispersion B.

The invention claimed is:

1. A dye receiving layer composition for thermal transfer image-receiving sheets, comprising a resin containing 70% by weight or more of a polyester produced by using an alcohol component containing 50 mol % or more of an alkyleneoxide adduct of 2,2-bis(4-hydroxyphenyl)propane represented by the formula (I):

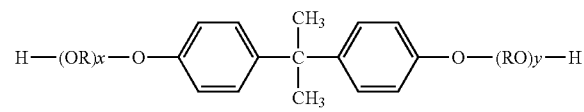

(I)

wherein RO is an oxyalkylene group; R is at least one group selected from an ethylene group and a propylene group; and x and y each represents a molar number of addition of alkylene oxides, and are respectively a positive number, with the proviso that a sum of x and y is from 2 to 7 on the average,
and an oxazoline group-containing compound.

2. The dye receiving layer composition according to claim 1, wherein at least a part of the oxazoline group-containing compound contains a crosslinked polyester obtained by crosslinking at least a part of the polyester therewith.

3. The dye receiving layer composition according to claim 1, wherein the polyester is produced by using a carboxylic acid component containing from 5 to 50 mol % of succinic acid containing at least one group selected from an alkyl group and an alkenyl group.

4. The dye receiving layer composition according to claim 1, wherein the resin containing the polyester is in the form of resin particles having a volume-median particle size of from 20 nm to 1 μm which are dispersed in an aqueous medium.

5. A thermal transfer image-receiving sheet having the dye receiving layer containing the dye receiving layer composition as defined in any one of claims 1 to 4.

6. A process for producing a dye receiving layer composition for thermal transfer image-receiving sheets, comprising the step of mixing a resin containing a polyester produced by using an alcohol component containing 50 mol % or more of an alkyleneoxide adduct of 2,2-bis(4-hydroxyphenyl)propane represented by the formula (I):

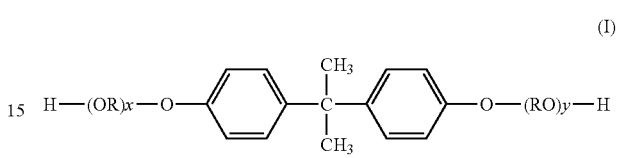

(I)

wherein RO is an oxyalkylene group; R is at least one group selected from an ethylene group and a propylene group; and x and y each represent a molar number of addition of alkylene oxides, and are respectively a positive number, with the proviso that a sum of x and y is from 2 to 7 on the average,
with an oxazoline group-containing compound.

7. The process according to claim 6, further comprising the step of reacting the resin containing the polyester with the oxazoline group-containing compound.

8. The process according to claim 6, wherein the polyester has an acid value of from 1 to 35 mgKOH/g.

9. The process according to claim 6, wherein the resin containing the polyester is in the form of resin particles dispersed in an aqueous medium.

10. The process according to claim 6, wherein the oxazoline group-containing compound is dispersed or dissolved in an aqueous medium.

11. A thermal transfer method comprising the step of conducting thermal transfer by using a thermal transfer image-receiving sheet having a dye receiving layer containing a composition which comprises a resin containing 70% by weight or more of a polyester produced by using an alcohol component containing 50 mol % or more of an alkyleneoxide adduct of 2,2-bis(4-hydroxyphenyl)propane represented by the formula (I):

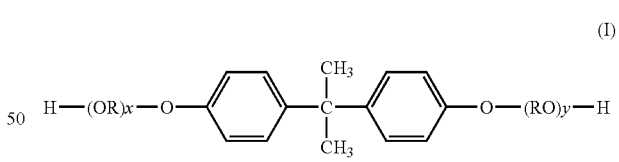

(I)

wherein RO is an oxyalkylene group; R is at least one group selected from an ethylene group and a propylene group; and x and y each represents a molar number of addition of alkylene oxides, and are respectively a positive number, with the proviso that a sum of x and y is from 2 to 7 on the average,
and an oxazoline group-containing compound.

* * * * *